(12) United States Patent
Wachsmann et al.

(10) Patent No.: US 10,556,579 B2
(45) Date of Patent: Feb. 11, 2020

(54) DRIVE APPARATUS IN A SELF-PROPELLED CONSTRUCTION MACHINE

(71) Applicants: Steffen Wachsmann, Koblenz (DE);
Niels Laugwitz, Lahnstein (DE);
Jens-Martin Zehbe, Schoningen (DE)

(72) Inventors: Steffen Wachsmann, Koblenz (DE);
Niels Laugwitz, Lahnstein (DE);
Jens-Martin Zehbe, Schoningen (DE)

(73) Assignee: BOMAG GmbH, Boppard (DE)

( * ) Notice: Subject to any disclaimer, the term of this patent is extended or adjusted under 35 U.S.C. 154(b) by 814 days.

(21) Appl. No.: 13/688,527

(22) Filed: Nov. 29, 2012

(65) Prior Publication Data
US 2013/0143714 A1    Jun. 6, 2013

(30) Foreign Application Priority Data
Dec. 1, 2011  (DE) .................. 10 2011 119 935

(51) Int. Cl.
*E01C 23/088*  (2006.01)
*E01C 23/12*  (2006.01)
*B60W 10/02*  (2006.01)

(52) U.S. Cl.
CPC .......... *B60W 10/02* (2013.01); *E01C 23/088* (2013.01); *E01C 23/127* (2013.01); *Y10T 477/27* (2015.01)

(58) Field of Classification Search
CPC ........ E01C 23/127; E21C 31/02; F16D 21/02; F16D 47/00
See application file for complete search history.

(56) References Cited

U.S. PATENT DOCUMENTS

| 8,608,250 | B2* | 12/2013 | O'Neill | 299/12 |
| 2005/0206216 | A1* | 9/2005 | O'Neill | 299/95 |
| 2007/0132304 | A1* | 6/2007 | Holl et al. | 299/39.8 |
| 2010/0105519 | A1 | 4/2010 | Kasuya et al. | |
| 2010/0141014 | A1* | 6/2010 | Busley et al. | 299/39.4 |

(Continued)

FOREIGN PATENT DOCUMENTS

DE    100 31 195 C1    1/2002

OTHER PUBLICATIONS

The German Patent Office, Search Report issued on German Patent Application No. 10 2011 119 935.0 dated Aug. 10, 2012.

(Continued)

*Primary Examiner* — David Bagnell
*Assistant Examiner* — Michael Goodwin
(74) *Attorney, Agent, or Firm* — Wood Herron & Evans LLP

(57) ABSTRACT

A drive apparatus in a self-propelled construction machine comprises a milling rotor and a main drive which can be coupled to the milling rotor via an engaging and disengaging clutch, and an auxiliary drive which can be coupled to the milling rotor alternatively to the main drive. The clutch is provided with a fixed side and an axially displaceable output side, which is displaceable between an engaged position and a disengaged position. The axially displaceable side is simultaneously also the engaging and disengaging part of a shiftable transmission, the fixed part of which is driven by the auxiliary drive, with the transmission and the clutch being engaged and disengaged in a selective fashion via the axially displaceable side of the clutch.

5 Claims, 2 Drawing Sheets

(56) References Cited

U.S. PATENT DOCUMENTS

| | | |
|---|---|---|
| 2010/0236847 A1 | 9/2010 | Yang et al. |
| 2011/0257858 A1 | 10/2011 | Kobayashi et al. |
| 2011/0266858 A1 | 11/2011 | Laux et al. |
| 2012/0200141 A1 | 8/2012 | Busley et al. |
| 2013/0300182 A1* | 11/2013 | Hammes et al. ............ 299/39.4 |
| 2014/0232169 A1* | 8/2014 | Schafer et al. ................. 299/10 |

OTHER PUBLICATIONS

Espacenet, English Machine Translation of DE10031195C1, published Jan. 10, 2002, retrieved from http://worldwide.espacenet.com on Sep. 28, 2015 (9 pages).

\* cited by examiner

DRIVE APPARATUS IN A SELF-PROPELLED CONSTRUCTION MACHINE

TECHNICAL FIELD

The invention relates to an apparatus in a self-propelled construction machine, comprising a milling rotor and a main drive which can be coupled to the milling rotor via an engaging and disengaging clutch, and an auxiliary drive which can be coupled to the milling rotor or alternatively to the main drive.

BACKGROUND OF THE INVENTION

Examples of self-propelled construction machines specifically include rollers, landfill compactors, road milling machines, recyclers, ground stabilizers and stationary and mobile crushers. Such machines comprise an internal combustion engine as the main drive, by means of which the travelling mechanism, a milling rotor and further working devices are driven. The milling rotor is lowered in working operation to a working position and it is operated at an operating speed.

In the case of maintenance and mounting work on the milling rotor of a milling machine, e.g. during the replacement of milling teeth, it is necessary to move the milling rotor slowly and step-by-step with small angular offset or continuously so that an operator has full access to the entire cylinder jacket, even when the milling rotor is installed in the milling machine. The first drive unit, if it is the main drive, is not suitable for this purpose, especially due to the high rotational speed and torque. For safety reasons, the use of the main drive is not permissible, and it must always be switched off during maintenance and mounting work. Therefore, this work is performed using a second drive unit as an auxiliary drive. The known methods of activation of this auxiliary drive with simultaneous deactivation of the main drive have turned out to be relatively complicated. An example of such an apparatus is known from DE 10031195 C1.

The invention is based on the object of providing an apparatus of the kind mentioned above which requires little installation space in the construction machine.

This object is achieved in such a way that the clutch is provided with a fixed side and, on the output side, with an axially displaceable side which is displaceable between an engaged position and a disengaged position, such that the axially displaceable side is simultaneously also the engaging and disengaging part of a shiftable transmission, the fixed part of which is driven by the auxiliary drive, with the transmission and the clutch being engaged and disengaged in a selective fashion via the axially displaceable side of the clutch.

SUMMARY OF THE INVENTION

The invention is based on the fundamental idea that the engaging and disengaging clutch is used both for opening and closing the main drive train and also for opening and closing the auxiliary drive train. The selective opening and closing ensures that the main drive and the auxiliary drive will never simultaneously be in engagement with the milling rotor. When the clutch is disengaged, the actuation path to be covered will be used to spatially separate the power flows of the auxiliary drive and the main drive from one another. The invention offers the advantage that the auxiliary drive can be integrated into the clutch of the construction machine in a cost-effective and compact manner.

Other advantages are described herein.

A toothed gearing or friction gearing is preferably used as the transmission. Spur wheels, bevel wheels or crown wheels are especially suitable for gearwheel pairings.

The clutch is preferably arranged as a disk clutch or multi-disk clutch. Furthermore, a disk or a plate, preferably a pressure disk, is arranged as a connecting element with the auxiliary drive. This bears the advantage that the connection with the auxiliary drive train can be produced in a simple way. The connecting element can advantageously also be arranged as a separate actuator, with which a movement of a clutch element is transmitted, e.g. an axially displaceable bushing or hollow shaft on the output shaft of the main drive which follows the movement of the pressure disk or plates.

It has proven to be appropriate that the axially displaceable side of the clutch is provided with a gear rim or friction rim for an operative connection with a corresponding counter-part on the side of the auxiliary drive.

In order to prevent a condition which, during the disengagement of the clutch and engagement of the transmission, the auxiliary motor is subjected to a speed for which it is not designed because the part of the drive train on the rotor side is trailing, a freewheel is appropriately provided between the auxiliary drive and the clutch. The freewheel prevents the auxiliary drive from being destroyed by an impermissibly high speed.

BRIEF DESCRIPTION OF DRAWINGS

The invention will be explained below in greater detail by reference to an embodiment shown in the schematic drawings, wherein.

DETAILED DESCRIPTION

Figure 1:
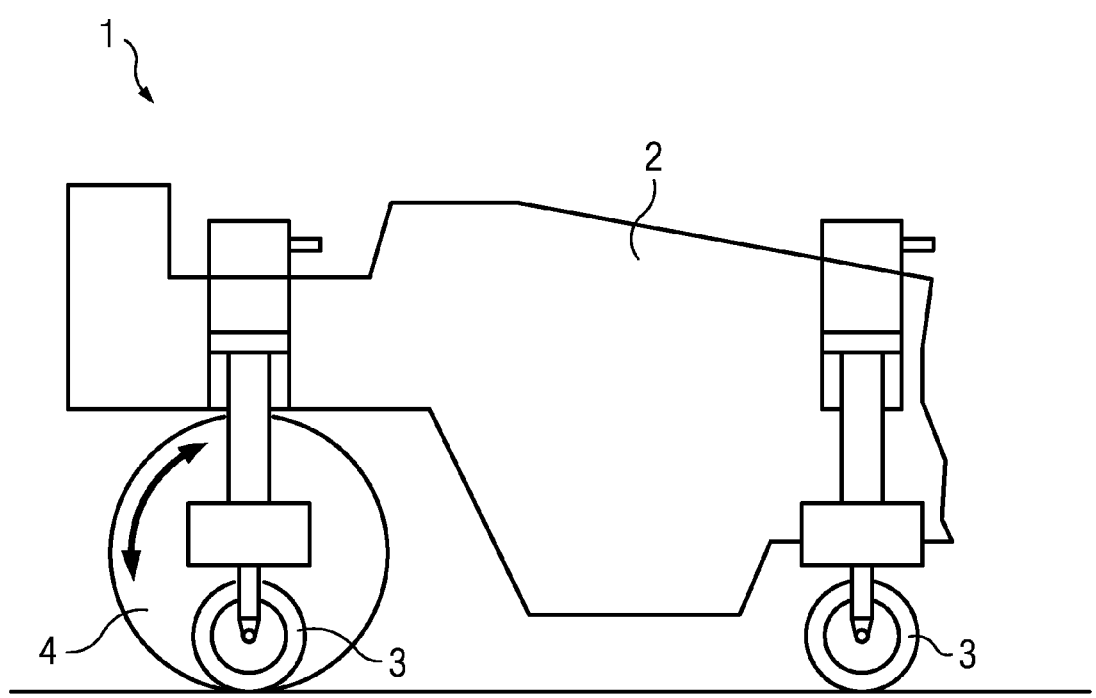
FIG. 1 shows a self-propelled construction machine in a side view.

In accordance with FIG. 1, a construction machine 1 arranged as a road milling machine for processing a roadway comprises a machine frame 2, wheels 3 and a milling rotor 4 which comprises milling teeth distributed over the rotor jacket. In the illustration of FIG. 1, the milling rotor 4 is in the lifted position in which it is freely rotatable and is not in engagement with the roadway. Since the jacket surface of the milling rotor 4 which is provided with the milling teeth can only partially be accessed in this position due to the machine frame 2, the milling rotor 4 needs to be freely rotatable in the lifted position for maintenance and mounting work, which is indicated by a double arrow.

Figure 2:
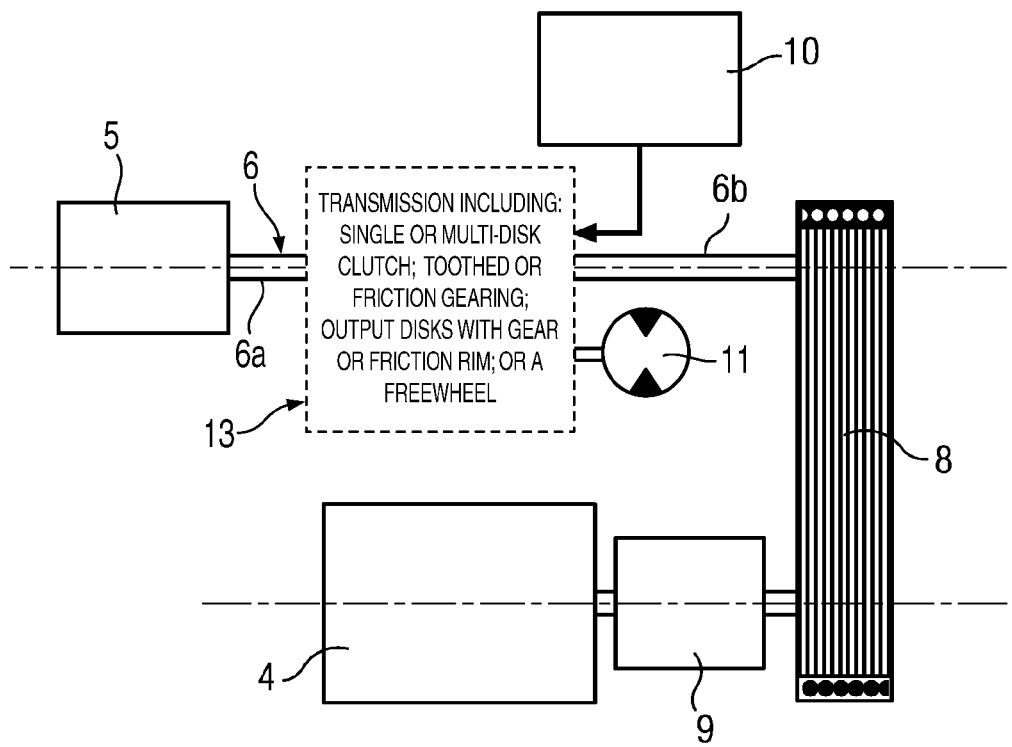
FIG. 2 shows two drive trains of the construction machine.

According to FIG. 2, the milling rotor is driven by way of a main drive train which comprises an internal combustion engine which is used as the main drive of the construction machine 1. The main drive train further comprises an output shaft 6 of the main drive 5, which can be separated via an engaging and disengaging clutch 7 into a section 6a on the side of the main drive and a section 6b on the side of the rotor, and is operatively connected for example via a belt drive 8 with a transmission 9 of the milling rotor 4. The clutch 7 is actuated by a control device 10. The first drive train is used for driving the milling rotor 4 during a milling operation, typically at rotor speeds of 80 to 150 rpm.

As an alternative to the main drive train, the milling rotor 4 is further driven by an auxiliary drive train with an auxiliary motor 11, which in the present case is arranged as a hydraulic motor. The auxiliary drive train includes the rotor-side section 6b of the output shaft 6, the belt drive 8 and the transmission 9. The auxiliary drive 11 is typically only designed for relatively low speeds which are suitable to rotate the milling rotor 4 for maintenance and mounting work and to rotate the milling rotor 4 in purposeful angular steps. A typical speed is 0.5 to 2 rpm.

The clutch 7 also comprises a changeover function between the main drive train and the auxiliary drive train. For this purpose, the rotor-side part of the clutch 7 is simultaneously also the engaging and disengaging part of an engaging and disengaging transmission 13, the fixed part of which is driven by the auxiliary drive. Depending on its position, it produces with the part on the rotor side either an operative connection with the section 6a of the drive shaft 6 on the side of the main drive or with the fixed part of the auxiliary drive train.

In the illustrated example, the clutch 7 is arranged as a single-disk clutch with a fixed flywheel 7a on the section 6a of the output shaft on the side of the main drive and an axially displaceable rotor-side pressure disk 7b on the section 6b of the output shaft 6 on the rotor side. The pressure disk 7b is axially displaceable between a first position A (FIG. 3) and a second position B (FIG. 3) according to the double arrow on the section 6b on the rotor side.

Figure 3:
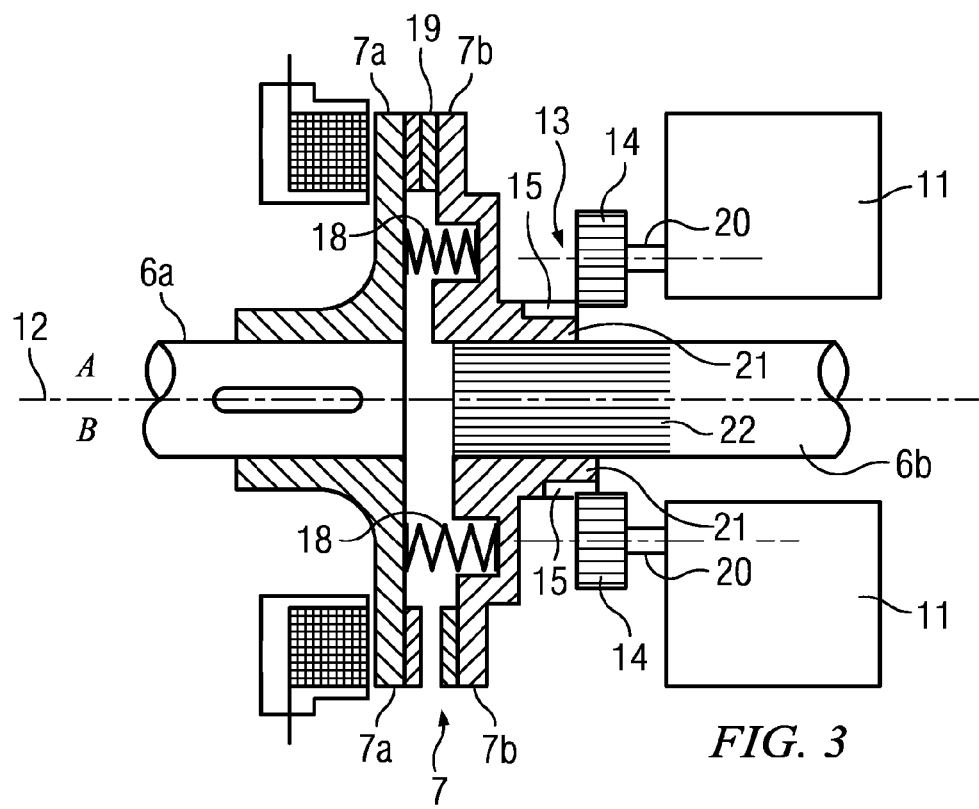
FIG. 3 shows a detail of the two drive trains according to FIG. 2 in two different operating states.

FIG. 3 illustrates the first position A in the upper half of the drawing and the position B in the bottom half of the drawing, which are separated by the central axis 12 of the two shaft sections 6a, 6b. The apparatus in the upper half of the drawing is mirrored along the central axis 12 in the bottom half of the drawing. The clutch 7 can be shifted electromagnetically, mechanically, hydrostatically or pneumatically. In the first position A, the clutch 7 is engaged against the force of a spring 18, and the frictional areas 19 are engaged into each other in a frictionally engaged manner between the flywheel 7a and the pressure disk 7b. The first drive train is closed. In the second position B, the clutch 7 is disengaged, with the spring 18 pressing the pressure disk 7b away from the flywheel 7a. The first drive train is interrupted. The pressure disk 7b is displaceable along a gearing 22 on the rotor-side section 6b of the drive shaft 6.

The transmission 13 comprises a gearwheel pairing consisting of a pinion 14 on an output shaft 20 of the auxiliary motor and a gear rim 15 on the pressure disk 7b which is formed as a cylindrical wheel on a hollow-cylindrical projection 21 of the pressure disk 7b. The projection 21 is located on the face surface of the pressure disk 7b, which faces away from the flywheel 7a, and is seated on the rotor-side section 6b of the output shaft 6.

The stationary pinion 14 is arranged in such a way that the gear rim 15 will only come into engagement with the pinion 14 when the clutch 7 is disengaged, and that the gear rim 15 will not be engaged with the pinion 14 when the clutch 7 is engaged. The transmission 13 is disengaged in the position A of the clutch 7, i.e. the pinion 14 and the gear rim 15 are out of engagement. In the position B of the clutch 7, the transmission 13 is engaged, i.e. the pinion 14 and the gear rim 15 are in engagement. The pressure disk 7b therefore selectively provides a friction-locked connection between the milling rotor 4 and the main drive or the auxiliary drive.

The coupling of the auxiliary drive 11 therefore occurs in such a way that the auxiliary drive and the main drive are selectively coupled or uncoupled during engagement and disengagement of the engaging and disengaging clutch, with the pressure disk 7b switching over the power flow to the milling rotor 4.

When driving the rotor 4 in the position B of the clutch 7, an operator can be granted successive access to the entire jacket surface of the rotor 4 and the milling teeth arranged thereon.

We claim:

1. An apparatus in a self-propelled construction machine, comprising:
    a milling rotor and a main drive which can be coupled to the milling rotor via an engaging and disengaging clutch, and an auxiliary drive which can be coupled to the milling rotor alternatively by the clutch to the main drive;
    the clutch being provided with a fixed input side and a displaceable output side, the displaceable output side being displaceable between an engaged position and a disengaged position, the displaceable output side also comprising an engaging and disengaging part of a shiftable transmission, a fixed part of the shiftable transmission being driven by the auxiliary drive, with the fixed part and the clutch being selectively engaged and disengaged via the displaceable output side of the clutch,
    wherein the clutch is a disk clutch or multi-disk clutch, and
    wherein a disk or plate is arranged as a connecting element with the auxiliary drive.

2. An apparatus in a self-propelled construction machine, comprising:
    a milling rotor and a main drive which can be coupled to the milling rotor via an engaging and disengaging clutch, and an auxiliary drive which can be coupled to the milling rotor alternatively by the clutch to the main drive;
    the clutch being provided with a fixed input side and a displaceable output side, the displaceable output side being displaceable between an engaged position and a disengaged position, the displaceable output side also comprising an engaging and disengaging part of a shiftable transmission, a fixed part of the shiftable transmission being driven by the auxiliary drive, with the fixed part and the clutch being selectively engaged and disengaged via the displaceable output side of the clutch,
    wherein the transmission includes a toothed gearing or a friction gearing.

3. An apparatus according to claim 2, wherein the displaceable output side of the clutch includes a pressure disk with a gear rim for operative connection with a counterpart of the auxiliary drive.

4. An apparatus according to claim 2, wherein the displaceable output side of the clutch is provided with a friction rim for operative connection with a corresponding counterpart on the side of the auxiliary drive.

5. An apparatus in a self-propelled construction machine, comprising:
    a milling rotor and a main drive which can be coupled to the milling rotor via an engaging and disengaging clutch, and an auxiliary drive which can be coupled to the milling rotor alternatively by the clutch to the main drive;
    the clutch being provided with a fixed input side and a displaceable output side, the displaceable output side being displaceable between an engaged position and a disengaged position, the displaceable output side also comprising an engaging and disengaging part of a shiftable transmission, a fixed part of the shiftable transmission being driven by the auxiliary drive, with the fixed part and the clutch being selectively engaged and disengaged via the displaceable output side of the clutch, wherein a freewheel is provided between the auxiliary drive and the clutch.

\* \* \* \* \*